United States Patent
Chatterjee et al.

(10) Patent No.: US 7,536,529 B1
(45) Date of Patent: May 19, 2009

(54) METHOD, SYSTEM, APPARATUS, AND COMPUTER-READABLE MEDIUM FOR PROVISIONING SPACE IN A DATA STORAGE SYSTEM

(75) Inventors: Paresh Chatterjee, Fremont, CA (US); Venkatesh Ramamurthy, Lilburn, GA (US); Loganathan Ranganathan, Fremont, CA (US); Anandh Mahalingam, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 159 days.

(21) Appl. No.: 11/254,347

(22) Filed: Oct. 20, 2005

Related U.S. Application Data

(60) Provisional application No. 60/689,587, filed on Jun. 10, 2005, provisional application No. 60/689,471, filed on Jun. 10, 2005.

(51) Int. Cl.
*G06F 9/26* (2006.01)
*G06F 9/34* (2006.01)
(52) U.S. Cl. .................................... 711/202; 711/111
(58) Field of Classification Search ................. 711/202, 711/111
See application file for complete search history.

(56) References Cited

U.S. PATENT DOCUMENTS

| | | | | |
|---|---|---|---|---|
| 5,974,426 A | * | 10/1999 | Lee et al. ................... | 707/202 |
| 2002/0161983 A1 | * | 10/2002 | Milos et al. ................. | 711/202 |
| 2003/0163630 A1 | * | 8/2003 | Aasheim et al. ............ | 711/103 |

* cited by examiner

*Primary Examiner*—Pierre-Michel Bataille
*Assistant Examiner*—Edward J Dudek
(74) *Attorney, Agent, or Firm*—Hope Baldauff Hartman, LLC

(57) ABSTRACT

A method, system, apparatus, and computer-readable medium are provided for dynamically provisioning available space in a data storage system without having to configure partitions at system startup. According to one method, a system table is maintained that includes entries corresponding to provisions within the available physical capacity of a data storage system. A volume table is also maintained that includes entries corresponding to territories within a logical data storage volume. When a data write operation is requested, a determination is made as to whether physical space has been allocated for the territory in the volume that is to be written. If physical space has not yet been allocated, the necessary physical space is allocated for the territory within the logical volume that is to receive the written data by creating a pointer to an available entry in the system table in an entry in the volume table corresponding to the territory to be written. Once the physical space has been allocated, the requested write operation is performed. Metadata is written to disk in a fashion that makes it easy to recover from system crashes and unclean shutdowns.

18 Claims, 11 Drawing Sheets

METHOD, SYSTEM, APPARATUS, AND COMPUTER-READABLE MEDIUM FOR PROVISIONING SPACE IN A DATA STORAGE SYSTEM

CROSS-REFERENCE TO RELATED APPLICATIONS

This application claims the benefit of U.S. provisional patent application No. 60/689,587, filed on Jun. 10, 2005, and U.S. provisional patent application No. 60/689,471, also filed on Jun. 10, 2005, both of which are expressly incorporated herein by reference in their entirety.

TECHNICAL FIELD

The present invention is related to the field of computer data storage systems. More particularly, the present invention is related to the field of configuration, management, and storage allocation within data storage systems.

BACKGROUND OF THE INVENTION

Large enterprises typically utilize large-scale storage systems to provide data storage facilities to their employees. Due to the massive scale of such systems, the task of administering a large-scale storage system can be a difficult one. In particular, system administrators responsible for large-scale storage systems perform a number of difficult tasks, including the partitioning of the storage system into multiple volumes to support the users and applications of the system. However, the task of determining the amount of storage space to be allocated to each volume is a difficult one because the administrator cannot know in advance the amount of space that will be utilized within each volume over a long period of time. An incorrect allocation of space may lead to the starving of some volumes for space, requiring the addition of new capacity to the volumes, while other volumes go underutilized. The underutilized volumes cannot be easily reassigned to volumes needing additional storage space.

A related problem faced by system administrators of large-scale storage systems is a function of the fact that the utilization of storage capacity within a storage system typically grows slowly. As a result, the majority of the capacity in a storage system is not being utilized at any given time. The unutilized storage space represents capital that has been expended by the enterprise but that is not being utilized. For the most part, organizations typically prefer to expend capital only on resources that are utilized.

In view of the above-described problems, system administrators expect to be able to enjoy the flexibility of unlimited storage expansion with a minimal amount of performance loss. Moreover, system administrators also expect to recover data after catastrophic power failures and to bring up a storage system quickly after a clean shutdown. Since each of these features desired by system administrators have different priorities in different environments, most system administrators are willing to accept some trade-offs. However, system administrators typically expect to tune the storage system so that the trade-offs can be balanced for the individual requirements of their particular organization.

It is with respect to these considerations and others that the present invention has been made.

SUMMARY OF THE INVENTION

In accordance with the present invention, the above and other problems are solved by a method, system, apparatus, and computer-readable medium for provisioning storage space in a data storage system. Through the embodiments of the invention, the available physical storage space in a data storage system can be allocated to different volumes at the time write requests are received, thereby freeing a system administrator from the difficult decision of allocating space to volumes in advance. This process is referred to herein as "thin provisioning." Additional physical storage capacity can also be added to the data storage system at any time, and dynamically allocated to volumes as needed. Because physical storage capacity may be allocated only when necessary, the problems of underutilization of storage space and capital are also minimized. Through the embodiments of the invention, these benefits can be accomplished with only a minor performance penalty.

According to one method provided by an embodiment of the invention, a first data structure is maintained by a data storage computer system that includes entries corresponding to a predefined portion of the available physical capacity of a data storage system. According to embodiments, the first data structure is a system table data structure having any number of entries, each of which correspond to portions of the available physical capacity of a predefined size. The portions of the physical capacity that are referenced by entries in the system table are referred to herein as provisions. In this manner, the entire available physical capacity of a data storage system is divided into provisions, and an entry is made available in the system table corresponding to each provision.

According to other aspects of the method, a second data structure is maintained that includes entries corresponding to a predefined portion of a logical data storage volume. According to embodiments, the second data structure is a volume table having any number of entries, each of which correspond to a portion of a logical data storage volume. The portion of the volume that is referred to by entries in the volume table are referred to as territories. Territories are data segments consisting of one or more provisions. Each entry in a volume table may be utilized to store a pointer to an entry in the system table.

According to other aspects of the method, a request may be received to perform a data write operation at a location within a territory of a logical storage volume. In response to such a request, a determination is made as to whether physical space has been allocated for the territory in the volume that is to be written. This determination may be made, for instance, by examining the contents of the entry in the volume table corresponding to the territory to be written. If a pointer to an entry in the system table exists in the entry, then physical space has been previously allocated for the territory. If no pointer exists, then physical space has not yet been allocated for the territory.

If physical space has not yet been allocated, the necessary physical space is allocated for the territory within the logical volume that is to receive the written data. In particular, a pointer to an available entry in the system table is created in the entry in the volume table corresponding to the territory to be written. The entry in the system table to which the pointer points determines the physical area where the write operation should be performed. Once the physical space has been allocated, the requested write operation is performed. Subsequent writes to the same logical territory on the volume are performed without allocation by following the pointer to the system table to determine the proper area where the data should be written. Read operations also determine the proper location to read from by utilizing the volume table and the system table in a similar manner.

According to other aspects of the invention, a separate volume table is maintained for each logical volume in the data storage system. When read or write requests are received directed to a particular volume, they are processed in the manner described above utilizing the appropriate volume table for the volume and the system table. Additionally, the size of each volume need not be specified in advance, or may be specified up to any size even including sizes in excess of the currently available physical capacity. The initial size of each volume is not limiting on the future size of the volume. Also, additional physical capacity may be added at any time. When physical capacity is added, additional entries are added to the system table that correspond to the newly added physical capacity. Moreover, the physical capacity may be contributed to by any number of nodes within the data storage system, so as to increase performance through the availability of additional spindles, processors, memory etc. Additionally, according to embodiments of the invention, metadata may be interleaved with written data from which the system table and volume tables may be reconstructed in the event of a crash or an unclean shutdown of the computer system.

According to other embodiments of the invention, a computer system is provided for provisioning physical storage to logical volumes as needed. The computer system includes one or more mass storage devices that together make up the available physical capacity of the computer system. Other computer systems may also contribute to the available physical capacity. The computer system includes a central processing unit ("CPU") and a memory storing a computer program executable on the CPU for receiving and responding to requests for reading and writing data on one or more logical storage volumes. The computer program is operative to maintain a volume table for each logical storage volume defined in the system. Logical volumes may be defined without specifying an initial size (or a nominal size), or may be specified having a size exceeding the available physical capacity of the system. Each volume table includes an entry for each territory within the corresponding volume. The computer program also maintains a system table that includes one entry for each provision within the available physical capacity of the computer system. This table may be maintained for allocated territories only, in order to minimize memory utilization.

According to aspects of the invention, the computer program is operative to receive a request to write data to a territory within a storage volume. In response, the computer program determines whether physical space has been allocated for the territory to be written based on the contents of the entry in the volume table corresponding to the territory to be written. If physical space has not been previously allocated for the territory to be written, the computer program creates a pointer in the entry of the volume table corresponding to the territory to be written, the pointer pointing to an entry in the system table for an available territory of the physical storage capacity. Once the physical space has been allocated, the requested write operation may be performed in the allocated area.

According to yet another embodiment of the invention, a computer-readable medium is provided having data structures stored thereon, including a first data structure and a second data structure. The first data structure comprises a system table and includes a first set of data fields corresponding to a portion of an available physical storage capacity. The second data structure comprises a volume table and includes a second set of data fields for storing a pointer to one of the first data fields in the system table for an allocated portion of a storage volume. According to embodiments, a third data structure may be stored on the computer-readable medium comprising a set of metadata from which the system table and volume table can be reconstructed in the event of an unclean shutdown of a computer system storing these tables.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
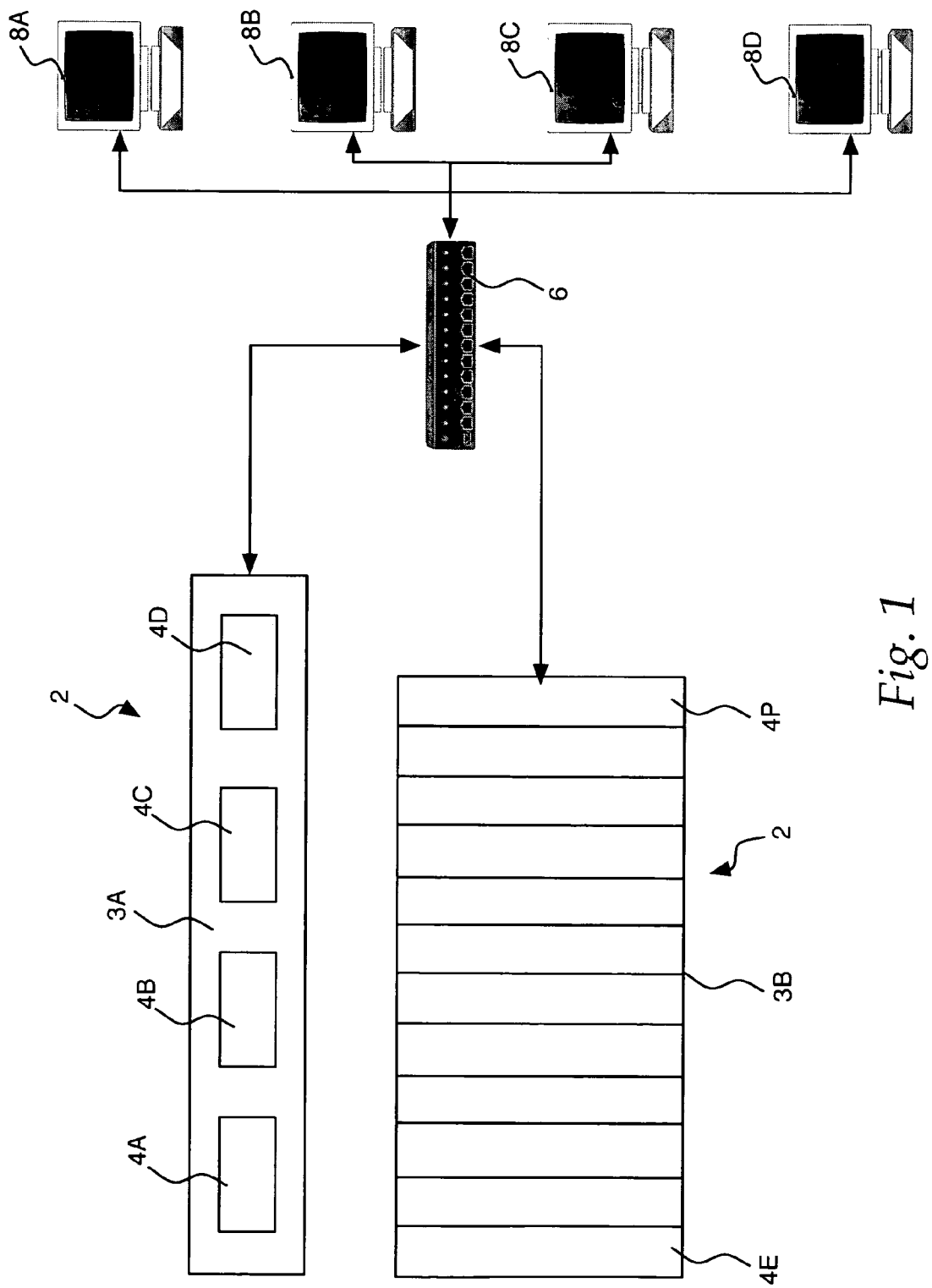
FIG. 1 is a computer architecture diagram showing aspects of a computer network utilized as an illustrative operating environment for the various embodiments of the invention.

Embodiments of the present invention provide a method, system, apparatus, and computer-readable medium for allocating physical storage space to logical volumes in a computer system as needed. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
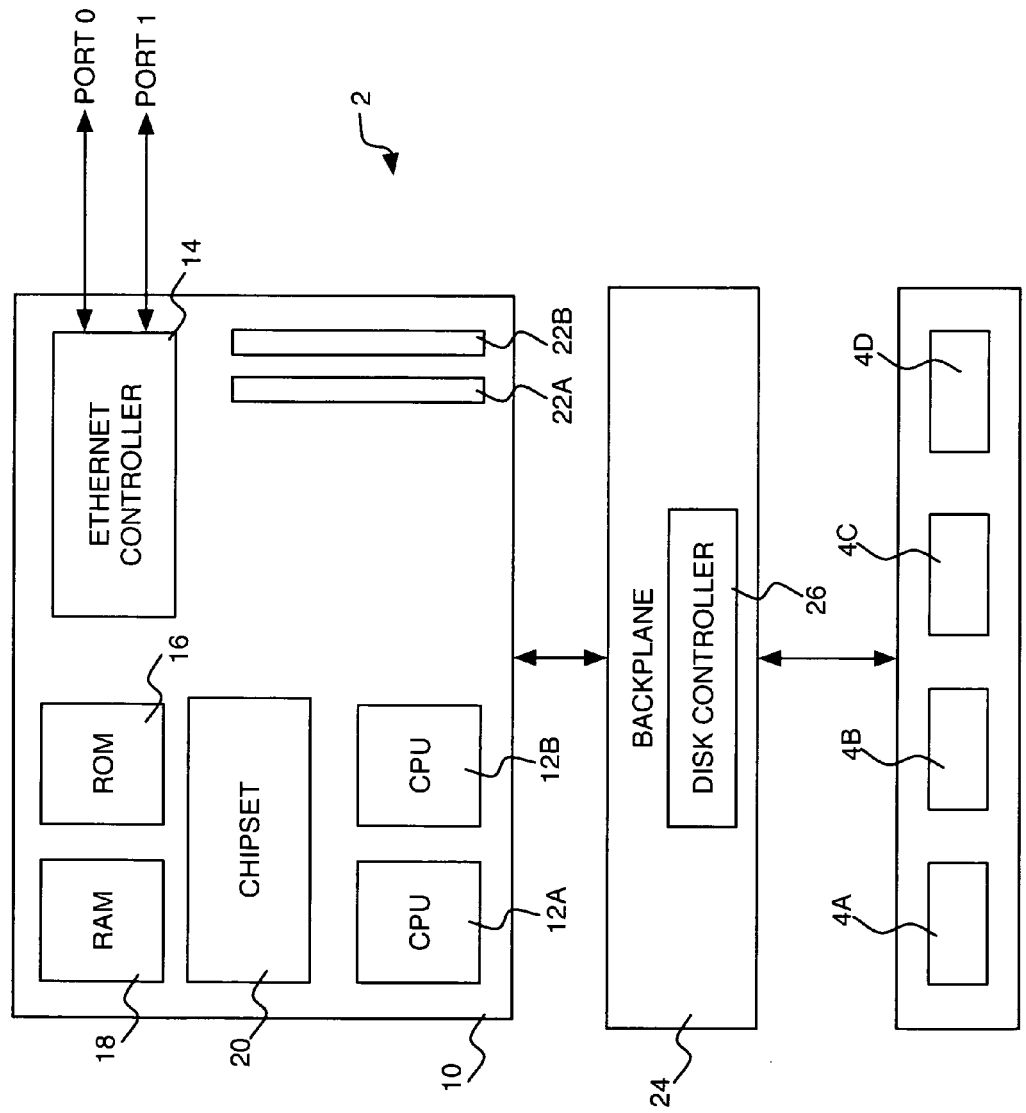
FIG. 2 is a computer architecture and network diagram illustrating aspects of a storage server computer provided by the various embodiments of the invention.
Figure 3:
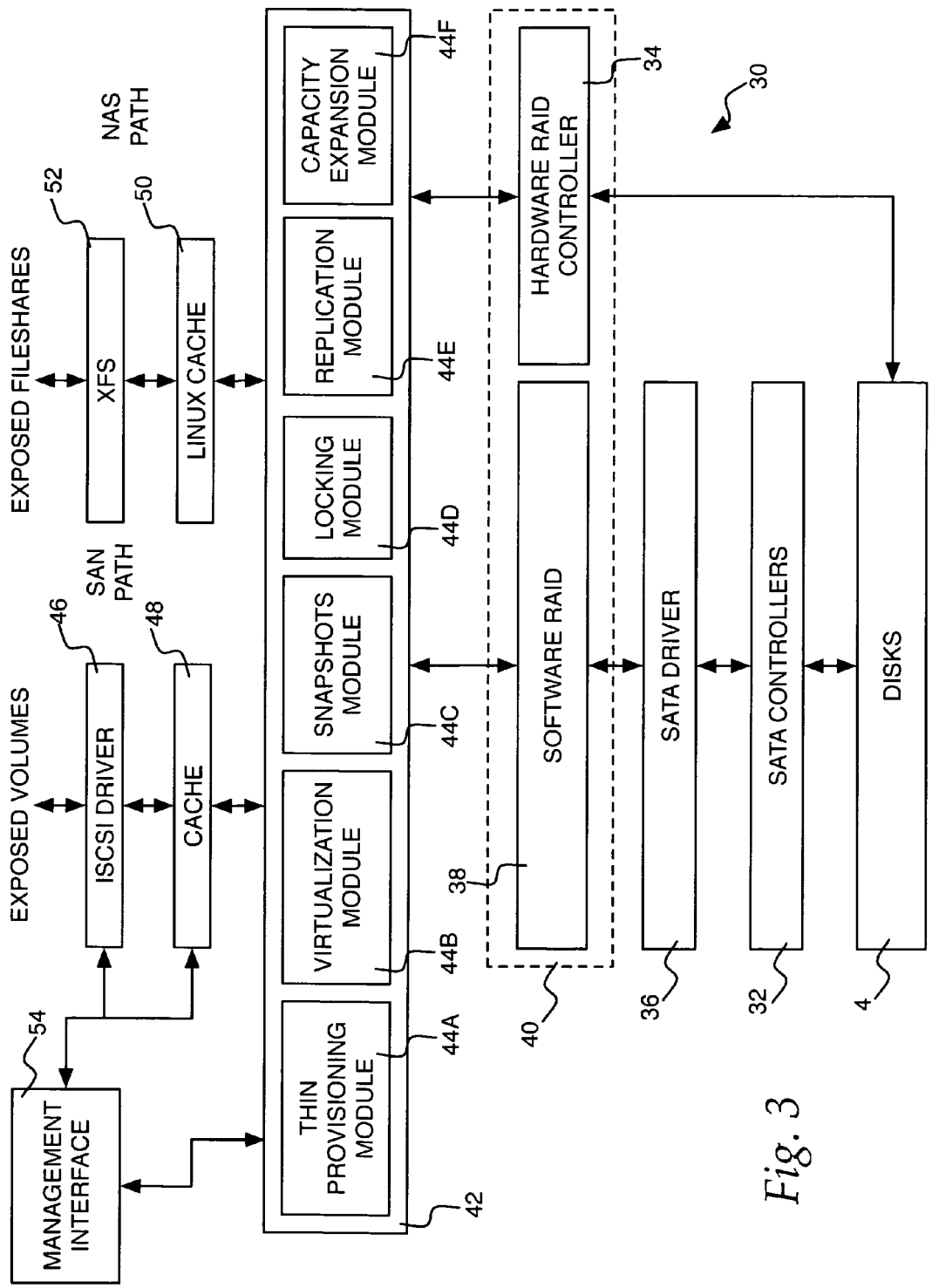
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol or the Serial Attached SCSI ("SAS") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. A SAS controller may also be embedded in the motherboard 10. It is also contemplated that the storage server computer 2 may include other components that are not explicitly shown in FIG. 2 or may include fewer components than illustrated in FIG. 2.

As described briefly above, the motherboard 10 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a kernel module 42 that implements the functions described herein. In particular, the kernel module 42 may provide functionality for implementing thin provisioning, virtualization, snapshots, locking, replication, and capacity expansion. These features are implemented by the modules 44A-44F, respectively, and are described in greater detail herein. In particular, the thin provisioning module 44A provides the functionality described herein for allocating physical capacity to logical volumes on an as-needed basis. Additional details regarding the operation of the thin provisioning module 44A are provided below with respect to FIGS. 4-11. The virtualization module 44B provides the facility to expand a volume into multiple servers, and to treat multiple servers as a single large storage device. The snapshots module 44C provides functionality for creating and utilizing point in time snapshots of the contents of logical storage volumes. The locking module 44D provides functionality for synchronizing input/output operations in a computer system that utilizes snapshots. The replication module 44E provides functionality for replication within the computer 2. The capacity expansion module 44F provides functionality for adding storage capacity to the computer 2.

Above the kernel module 42, a number of software components are utilized depending upon the access mechanism utilized to access the data stored on the hard disk drives 4. In particular, a Storage Area Network ("SAN") path is provided that utilizes a cache 48 and an Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drivers of kernel module 42 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, aspects of the invention may be implemented with the FREEBSD operating system or with the WINDOWS family of operating systems from MICROSOFT CORPORATION of Redmond, Wash. The invention may also be implemented on a multitude of processor families, including the Intel x86 family of processors, the Intel XScale family of processors, or the IBM PowerPC family of processors.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
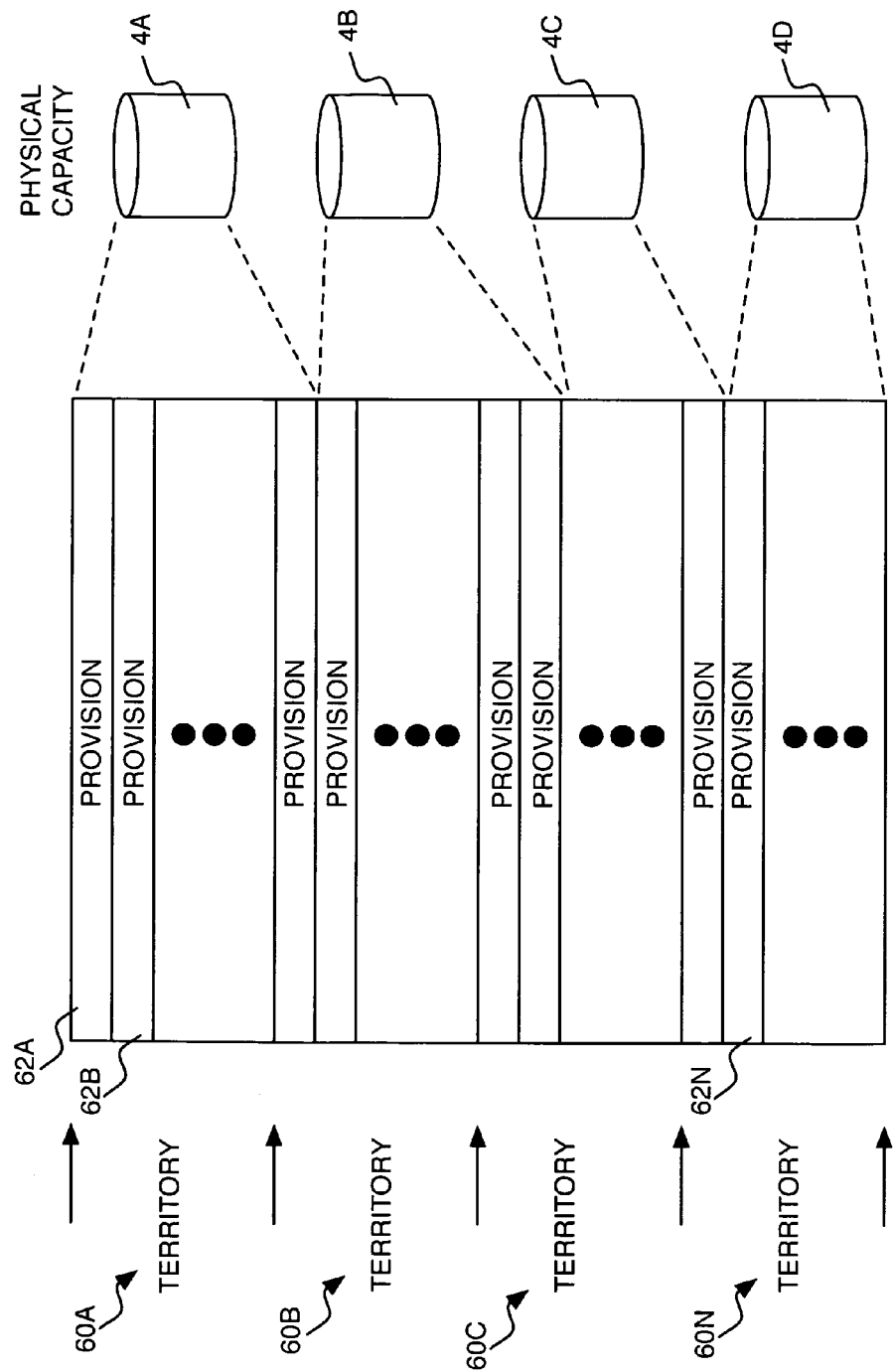
FIG. 4 is a block diagram illustrating a process for dividing the physical capacity of a data storage server computer into provisions and territories according to aspects of the invention.

Referring now to FIG. 4, additional details regarding the division of the physical capacity of the computer 2 into provisions 62A-62N and territories 60A-60N will be provided. As shown in FIG. 4, the available physical capacity of the computer 2 is made up of a number of hard disk drives 4A-4D. It should be appreciated that other computer nodes connected to the computer 2 may also contribute physical capacity to the available physical capacity of the computer 2. As also shown in FIG. 4, the available physical capacity is divided into a number of unique, equally sized areas, called territories 60A-60N. As will be described in greater detail herein, physical space is provisioned when new write operations are received, in areas having the granularity of a territory. According to embodiments, the preferred size of a territory is one gigabyte ("GB"). However, it should be appreciated that territories of other sizes may be utilized.

As also shown in FIG. 4, the available physical capacity is further subdivided into units referred to herein as provisions 62A-62N. The provisions 62A-62N comprise unique, equally sized areas of the available physical capacity and are smaller in size than the territories 60A-60N. In particular, according to a preferred embodiment, the provisions 62A-62N are one megabyte ("MB") in size. Accordingly, each territory includes one thousand and twenty-four provisions. It should be appreciated that provisions of other sizes may also be utilized, and multiple provision and territory granularities may co-exist in the same server.

It should also be appreciated that by subdividing the available physical capacity of the computer 2 into areas of different sizes, the territories and provisions, the physical capacity may be provisioned in units of different sizes when appropriate. For instance, as will be described in greater detail below, capacity may be provisioned in units of territories in response to new writes being received at a logical volume. Capacity may be allocated in units of provisions when snapshots are being utilized by the computer 2. A storage snapshot is a read-only volume that is a point-in-time image of a volume, and can be created, mounted, deleted, and rolled back onto the volume arbitrarily. When a snapshot is taken, and a new write arrives at a logical location in the volume at which data was already written before the snapshot, physical space is needed to store the new data at a different location from the old data. Either the old data or the new data is copied to the new location for this purpose, depending on the snapshot methodology being used. The space allocated for the snapshot is allocated in units of provisions. According to embodiments of the invention, space may be allocated for snapshots, if needed, up to half of the limit of the total available physical space. Other limits may be utilized similarly. Additional details regarding the allocation of physical space in territories and provisions are provided below.

Figure 5:
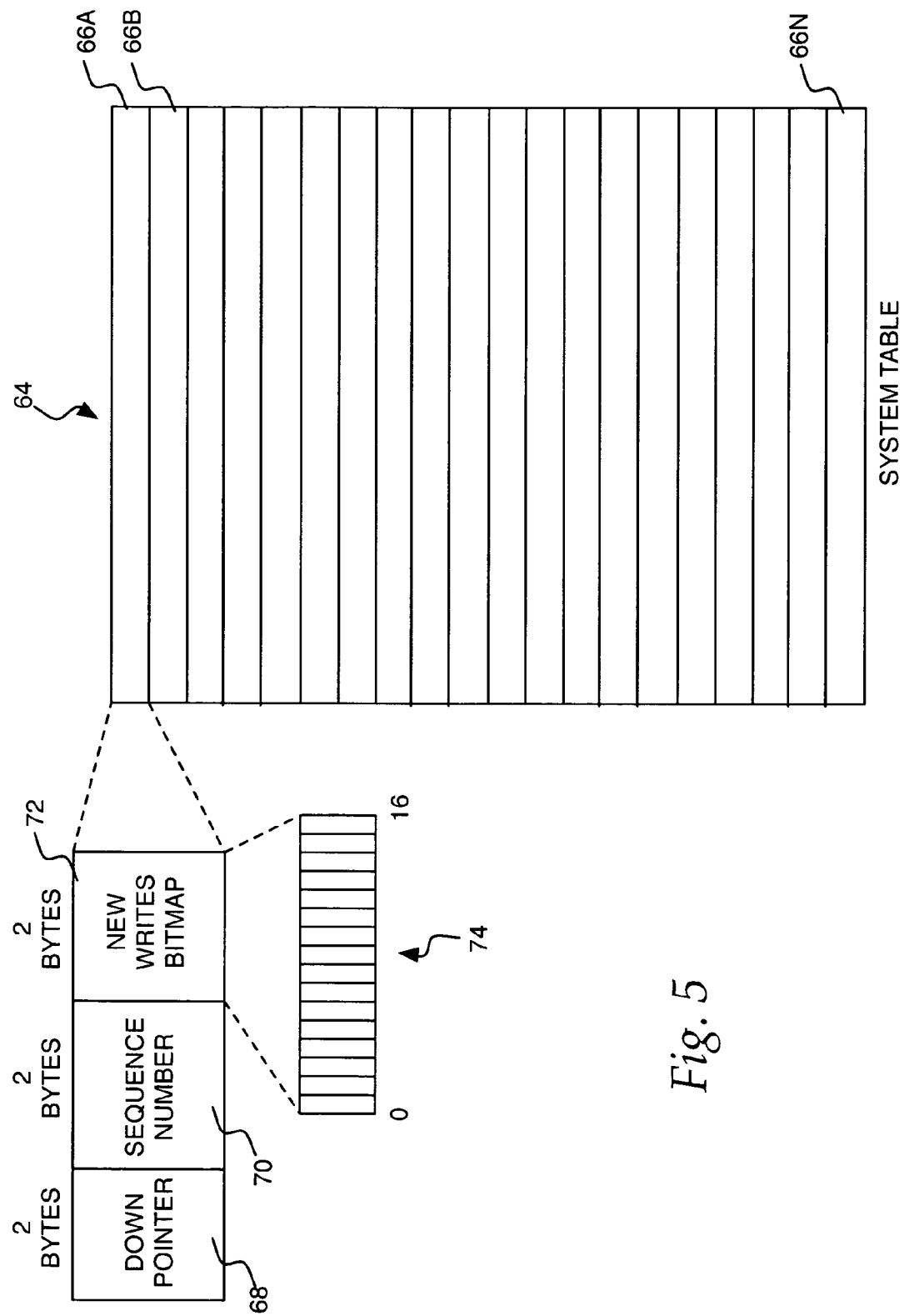
FIG. 5 is a data structure diagram illustrating aspects of a system table data structure provided by embodiments of the invention.

Turning now to FIG. 5, additional details regarding the structure and use of a system table data structure provided by embodiments of the invention will be described. In particular, FIG. 5 illustrates a system table 64 provided by and utilized in the embodiments of the invention. The system table 64 includes a number of entries 66A-66N, each of which is mapped to a unique portion of the available physical storage of the computer 2. If additional physical storage is made available to the computer 2, then additional entries may be added to the system table 64 that correspond to portions of the newly added storage. According to embodiments, each of the entries 66A-66N in the system table 64 correspond to a provision within the available physical storage space of the computer 2.

As also shown in FIG. 5, each entry 66A-66N in the system table 64 contains a number of data fields that implement a variety of advanced storage features. For example, each entry may include a down pointer field 68, a sequence number field 70, and a new writes bitmap field 72, in order to provide snapshot support. Each of the fields in the system table is utilized when the computer 2 is utilized to not only provide as needed allocation of physical storage space, but also to provide snapshots. In particular, the sequence number field 70 is utilized to specify the snapshot lifetime that a particular provision is allocated in. The down pointer field 68 is utilized to store a pointer to another entry in the system table 64 that identifies the next physical provision belonging to the same volume and with the same logical provision number. The field 68 is utilized to create a linked list of system table entries from which the data for any provision during any snapshot lifetime can be stored and recreated. The new writes bitmap field 72 is utilized to store a bitmap 74 that indicates whether each chunk of the provision is valid or whether newer data exists for the chunk in another provision. A chunk comprises a $1/16^{th}$ portion of the provision. For a 1MB provision, therefore, a chunk comprises a 64 kilobyte ("kB") area. It should be appreciated that the provisions may be divided into chunks of different sizes and that more or fewer bits may be utilized in the bitmap 74 to indicate the portions of a provision that contain valid data for a snapshot lifetime. In this manner, the system table 64 provides information regarding each provision in the computer 2.

It should also be appreciated that other information may be stored for each provision in order to provide other advanced storage features. For instance, each entry may include fields to track last-accessed-time, in order to provide Information Lifecycle Management support. Alternately, each entry may include fields to track the storage of a volume across multiple nodes, thereby providing Virtualization support. In this manner, the system table provides support for a multitude of data structures, each of which contributes a useful feature to the system.

The system table 64 is maintained by the computer 2 and stored in the RAM 18 of the computer 2 for fast access. However, it should be appreciated that, according to embodiments of the invention, the entire system table 64 may not be stored in the RAM 18 at one time. In particular, because only the entries of the system table 64 that correspond to allocated portions of the physical storage space are valid, the entire system table 64 is not stored in the RAM 18 all the time. Rather, the system table 64 is allocated territory by territory as described herein, and can therefore be stored in the RAM 18 of the computer 2 as an array of pointers to system table segments, each of which contains the system table for the provisions within a single territory. The volume table data structures described below may be stored in a similar manner. Alternately, the system table and volume table data structures may be stored in non-volatile RAM (NV-RAM), or may be stored on disk and swapped in and out of main memory as necessary. Other methods for storing the system table 64 and the volume tables described below will be apparent to those skilled in the art.

Figure 6:
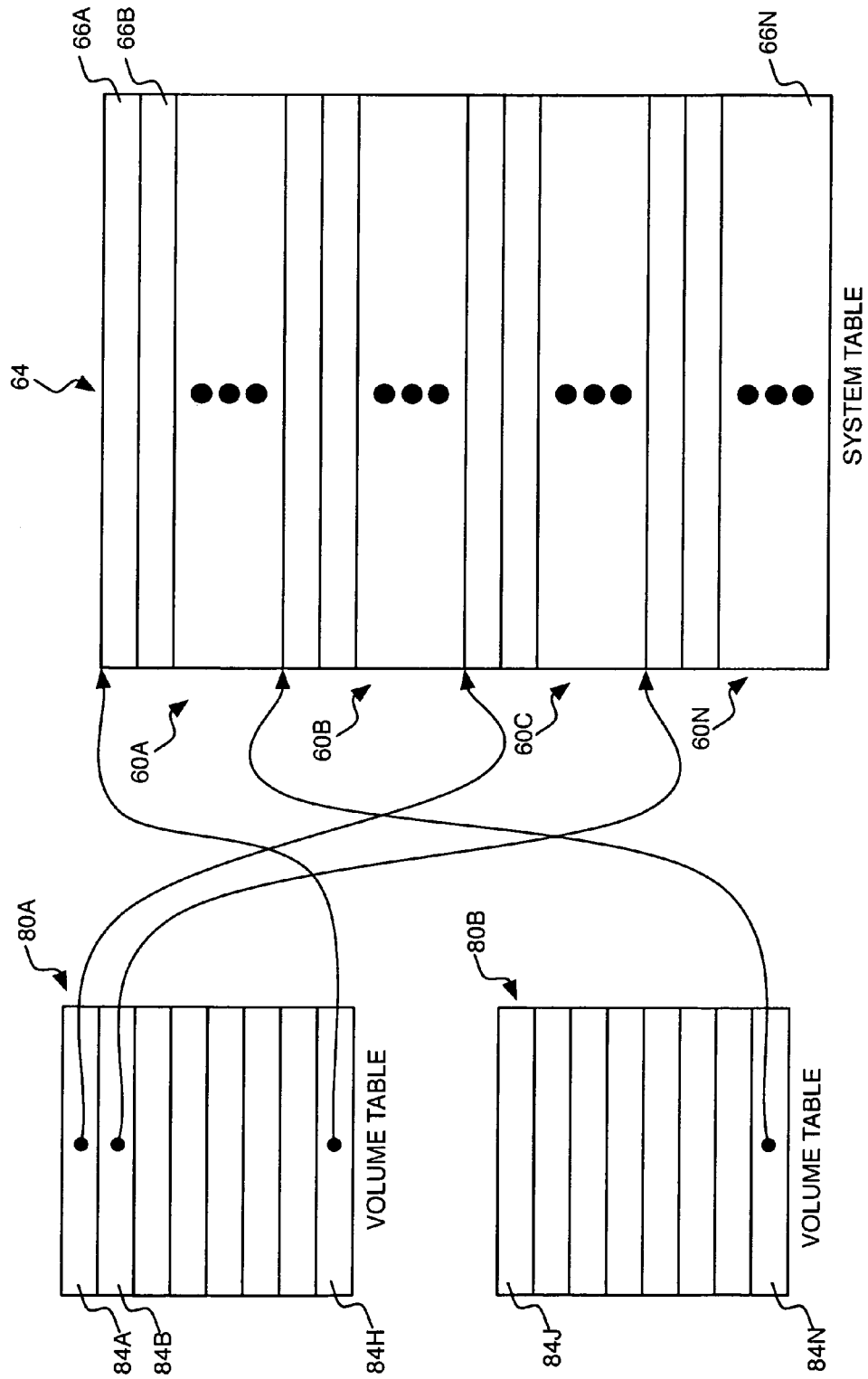
FIG. 6 is a data structure diagram illustrating aspects of a volume table data structure and a system table data structure provided by embodiments of the invention.

Referring now to FIG. 6, additional details regarding the system table and a volume table data structure provided by and utilized by the embodiments of the invention will be described. As shown in FIG. 6, a volume table 80A-80B is utilized for each logical storage volume defined in the computer 2. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume.

Each entry in a volume table 80A-80B can be utilized to store a pointer to a territory in the system table 64. The pointer is created when physical space for the logical territory in the volume is allocated. For instance, a first write request may be received that is directed to the territory reference by the entry 84H of the volume table 80A. In response to the request, physical space is allocated by creating a pointer in the entry 84H to the next available territory, the territory 60A, in the system table 64. If a second write request is received directed to the territory referenced by the entry 84N in the volume table 80B, space is allocated by creating a pointer in the entry 84N to the next available territory 60B. A third write operation directed to a portion of the volume corresponding to the entry 84A will cause a pointer to be created to the territory 60C. Similarly, a fourth write operation that is directed to a portion of the volume corresponding to the entry 84B will cause a pointer to be created to the territory 60N referenced by the system table 64. In this manner, physical space is allocated for logical territories within volumes on an as needed basis.

It should be appreciated that there is no requirement that territories must necessarily be of the same size. For example, sparse writes may be stored together in one territory with entries in the system table to distinguish them. It is also possible to adaptively allocate territories of different sizes to different kinds of I/O loads.

It should also be appreciated that, according to embodiments of the invention, the territories within a volume may be alternately allocated from storage devices connected to different hosts. For instance, storage for the even numbered territories within a volume may be allocated from physical devices connected to a first node, while storage for the odd numbered territories within the volume may be allocated from physical devices connected to a second node. Allocating storage for territories in this manner can improve read/write performance.

When read operations are received, it is necessary to utilize both the volume table for the corresponding logical volume and the system table to perform the read operation. In particular, the appropriate volume table is examined to determine the location within the system table that refers to the territory where the requested data is stored. From the system table, the start of the physical location containing the requested territory can be determined. The offset within the particular territory can then be utilized to locate the actual data. Additional details regarding this process are described below with reference to FIG. 9.

It should be appreciated that new entries may be added to each of the volume tables, thereby allowing the logical volumes to grow to any size within the available physical capacity. Moreover, it should be appreciated that because the size of logical volumes is only limited by the available physical storage space, it is necessary to define the size of the logical volumes only nominally in advance. Alternatively, the logical volumes may be defined as any size, even sizes larger than the available physical capacity. This is possible because physical space is allocated only as needed.

Because provisioning physical space in the manner described herein does not actually provide more physical space than actually available to the computer 2, additional physical capacity must be added when write requests can no longer be allocated an available territory. To prevent loss of availability when this occurs, warnings must be provided to a system administrator in advance that space is being depleted. Accordingly, a monitoring function is provided for determining when the total amount of physical space that may be allocated to volumes is below a predefined threshold. Additionally, a monitoring function may also be provided for determining when the amount of space available for allocation to snapshot provisions falls below a predefined threshold. When either of these situations occur, a warning may be generated and transmitted to a system administrator so that additional physical capacity may be added. Additional details regarding this process are provided below with respect to FIG. 9.

Figure 7:
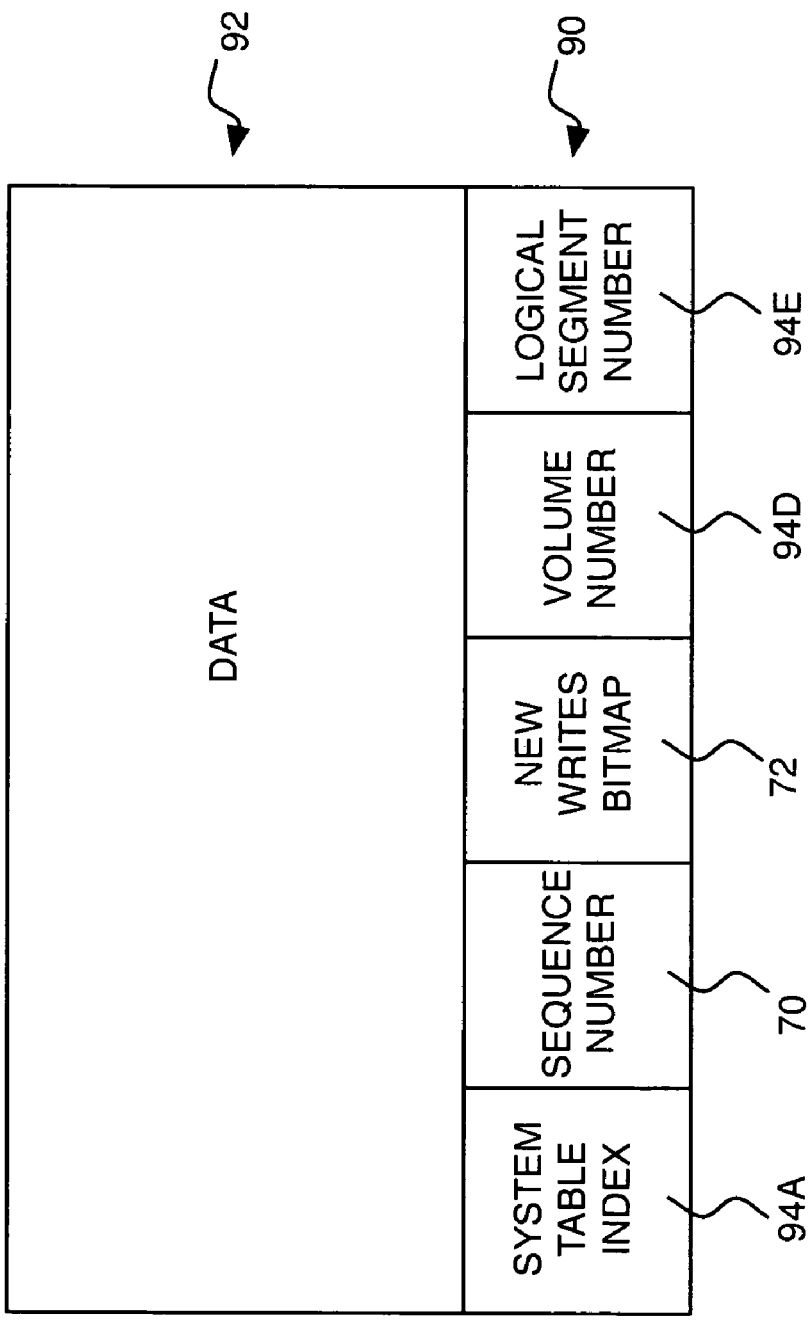
FIG. 7 is a data structure diagram illustrating aspects of a provision table data structure provided by embodiments of the invention.

Turning now to FIG. 7, details regarding a provision table data structure provided by and utilized in the various embodiments of the invention will be described. Because the system table 64 and the volume tables 80 are typically stored in the RAM 18 of the computer 2, the data stored therein is susceptible to loss if power is to fail to the computer 2. While it is possible to write the data described above to disk each time a change is made, the large number of writes required to store all of the data would impose a significant performance penalty. There are several solutions possible to this problem. In particular, two embodiments are to use a data structure called a provision table, or to employ a form of logging. The former solution provided by the embodiments of the invention to this problem is to compress the data for each write into a single metadata structure that is maintained consistently on disk, and from which the volume tables and the system table can be reconstructed in the event of a power failure. This data structure is referred to herein as a provision table. The latter solution consists of generating a short message which encapsulates the changes in these structures whenever they are changed, which is logged to a certain portion of the disk.

FIG. 7 illustrates a provision table 90 that is provided by the embodiments of the invention specifically for a system that supports snapshots. A provision table 90 is associated with each provision and is stored interleaved with the data 92 of the provision. The provision table 90 is written whenever the system table 64 is changed. Because the system table 90 is changed each time a new writes bitmap field 72 changes, a provision table 90 is ultimately written each time the new writes bitmap field 72 for the provision is modified.

The provision table 90 includes a system table index field 94A that identifies the entry in the system table 64 that the provision table 90 corresponds to. The provision table 90 also includes a sequence number field 70 that identifies the sequence number of the snapshot. The provision table 70 also includes the new writes bitmap 72 for the provision, described above. A volume number field 94D and a logical segment number field 94E are also provided within the provision table 90 to identify the volume and segment that the provision belongs to, respectively. As will be described in greater detail below, the contents of each of the provision tables 90 can be utilized to recreate the system table 64 and the volume tables 80. Additional details regarding this process are described below with respect to FIGS. 10-11.

Figure 8:
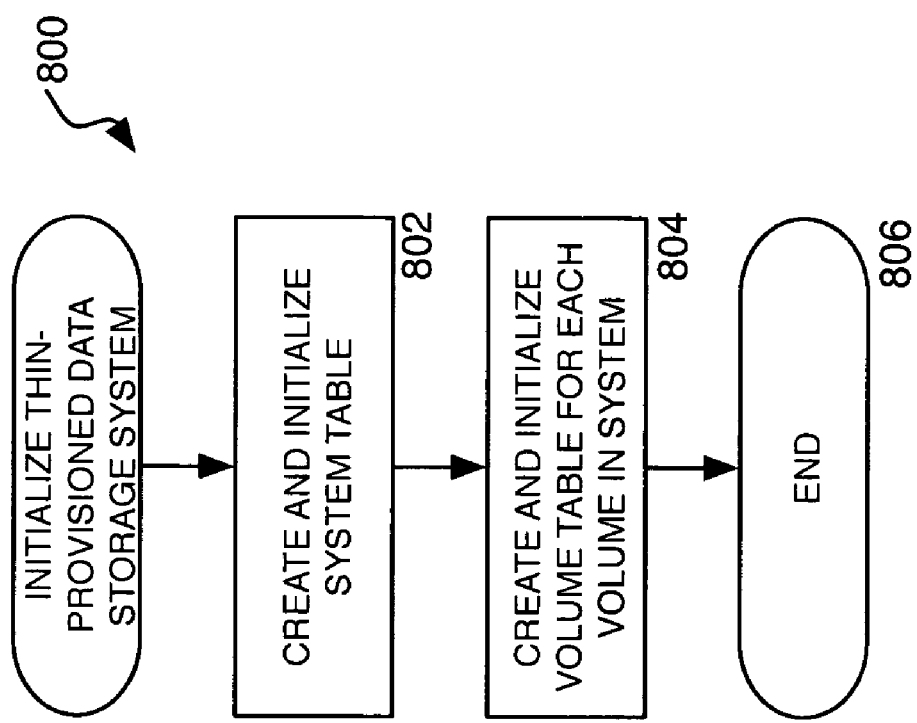
FIGS. 8-11 are flow diagrams illustrating aspects of the various processes provided by the embodiments of the invention for provisioning storage space in a computer system.

Referring now to FIG. 8, additional details regarding the operation of the computer 2 for provisioning available data storage capacity as needed will be provided. In particular, a routine 800 will be described illustrating initialization operations performed by the computer 2. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 8-11 making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 800 begins at operation 802, where the system table 64 is created and initialized. As described above, the system table 64 is stored in the RAM 18 of the computer 2. Moreover, as also described above, the system table 64 may be stored entirely in the RAM 18 or may be allocated territory-by-territory in the manner described above. Once the system table has been created and initialized, the routine 800 continues from operation 802 to operation 804.

At operation 804, a volume table 80 is created and initialized for each logical storage volume defined within the computer 2. Because no space has yet been allocated, each entry in the volume table is set to null. Once the volume tables have been created and initialized, the computer 2 is ready to receive and respond to read and write requests. From the operation 804, the routine 800 continues to operation 806, where it ends.

Figure 9:
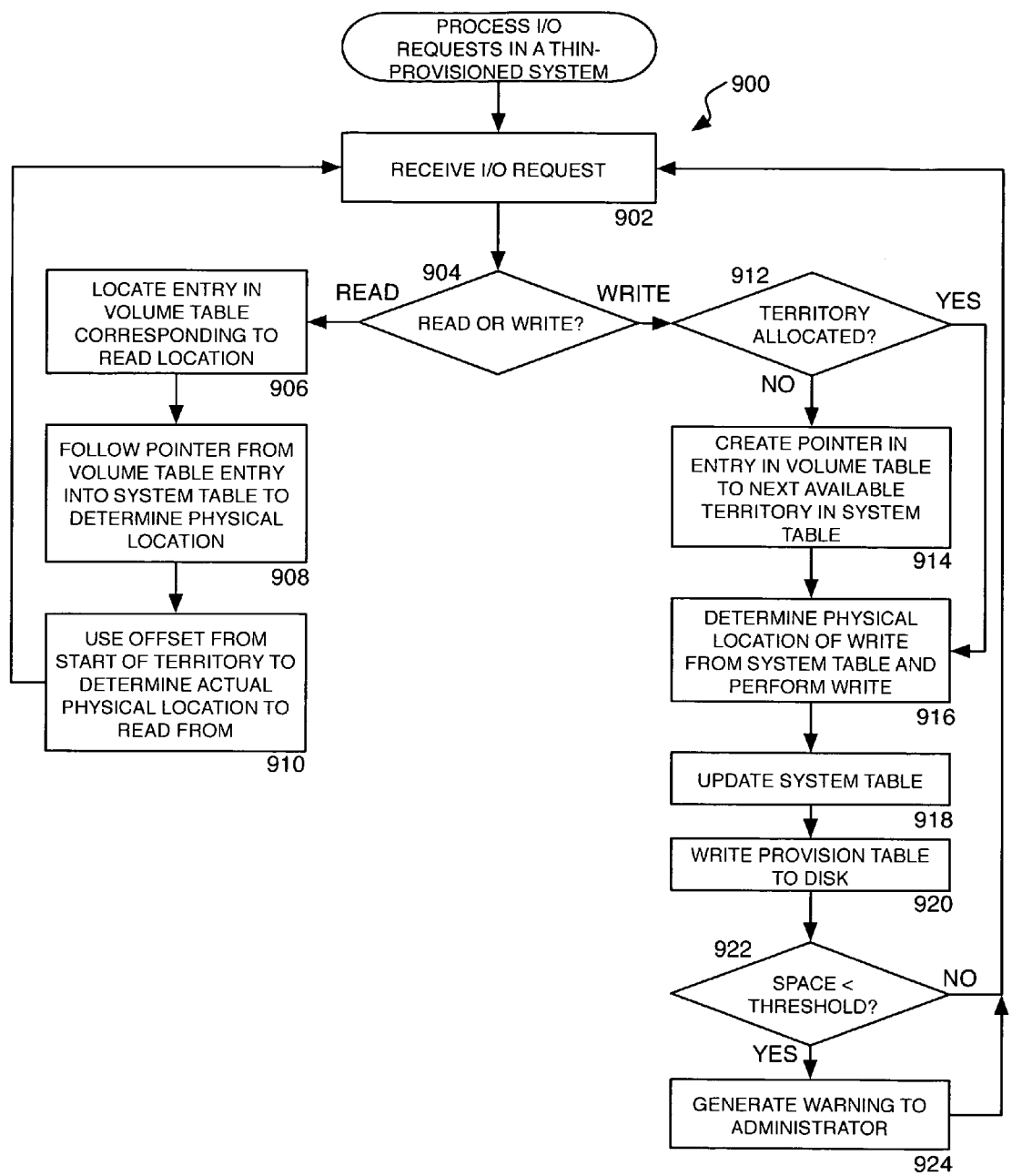

Referring now to FIG. 9, an illustrative routine 900 will be described for processing read and write operations directed to the computer 2. In particular, the routine 900 begins at operation 902, where an input/output request is received. The routine 900 then continues to operation 904, where a determination is made as to whether the request is a read operation request or a write operation request. If the request is for performing a read operation, the routine 900 branches from operation 904 to operation 906.

At operation 906, the entry in the appropriate volume table is located that corresponds to the territory to be read from. If the entry is null, the territory has not yet been allocated, so an error may be returned in response to the read request. Otherwise, the routine 900 continues to operation 908, where the pointer contained in the located entry is followed into the system table 64. From the pointed to location within the system table 64, the physical location of the territory allocated to the logical territory can be determined. The routine 900 then continues to operation 910, where the offset from the start of the logical territory to the block to be read is utilized to determine the actual location to be read within the located physical territory. Once this has been performed, the requested block is read from the physical device and the read data is returned in response to the original read request. From operation 910, the routine 900 returns to operation 902, where another read/write request may be processed in a similar manner.

If, at operation 904, it is determined that the request is for performing a write operation, the routine 900 branches to operation 912. At operation 912, a determination is made as to whether physical space has been allocated to the logical territory in which the data is to be written. This may be accomplished, for instance, by examining the appropriate entry in the volume table. If the entry contains a valid pointer, then space has been allocated and the routine 900 branches from operation 912 to operation 916. If the entry contains a null pointer, then space has not been allocated and the routine 900 continues from operation 912 to operation 914.

At operation 914, a valid pointer is created in the entry in the volume table corresponding to the logical volume to be written. The pointer points to the next territory in the system table available for allocation. The routine 900 then continues to operation 916, where the actual location of the data to be written within the allocated territory is located and the write operation is performed. From operation 916, the routine 900 then continues to operation 918, where the contents of the system table 64 are updated to reflect the write operation. The provision table 90 is also written at operation 920. From operation 920, the routine 900 continues to operation 922.

At operation 922, a determination is made as to whether the physical space available for allocation to volumes or snapshots has fallen below a predefined threshold. If not, the routine 900 branches back to operation 902, where additional read/write operations may be performed in the manner described above. If so, the routine 900 continues to operation 924, where a warning is generated to a system administrator indicating that the available physical capacity has fallen below the defined threshold. In response to such a request, the system administrator may add physical capacity to the computer 2. The routine 900 then returns from operation 924 to operation 902, described above.

Figure 10:
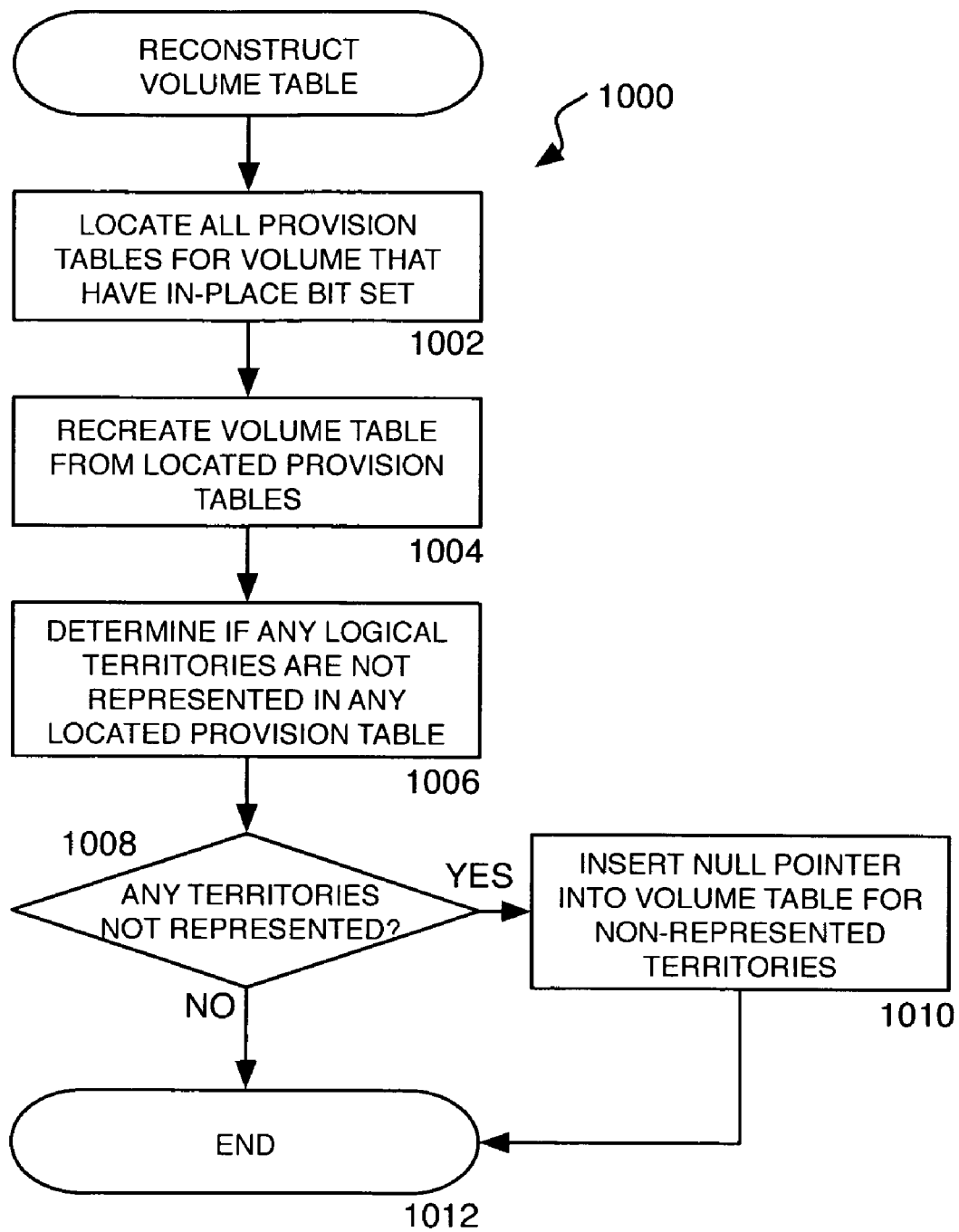

Turning now to FIG. 10, additional details regarding a routine 1000 for reconstructing the volume tables from the provision tables will be described. In particular, the routine 1000 begins at operation 1002, where all of the provision tables 90 that have the in-place bit field set are located. The routine 1000 then continues to operation 1004, where the volume table is recreated from metadata contained in the located provision tables 90.

From operation 1004, the routine 1000 continues to operation 1006, where a determination is made as to whether any logical territories within the volume are not represented by a located provision table. At operation 1008, the routine 1000 branches to operation 1010 if any logical territories are located that are not represented by a provision table. At operation 1010 a null pointer is inserted into the entry in the provision table for any territories that are not represented by a provision table. The routine 1000 then continues from operation 1010 to operation 1012, where it ends.

Figure 11:
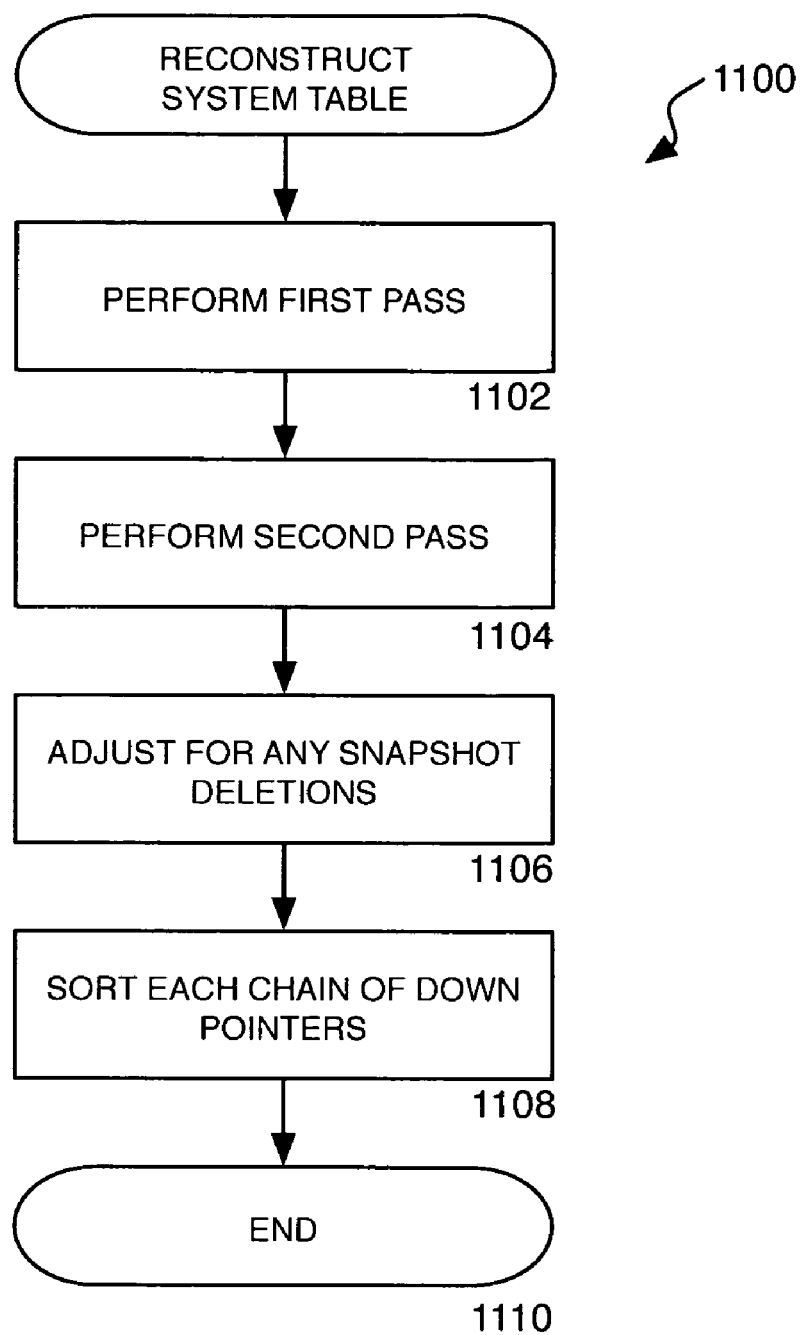

Referring now to FIG. 11, additional details regarding a process 1100 for reconstructing the system table 64 from the provision tables 90 will be described. The routine 1100 begins at operation 1102, where a first pass is made over the provision tables. During this pass, the details of each valid provision table are filled into the corresponding entry in the system table 64. An additional field is maintained temporarily during reconstruction for the logical provision number. Once this first pass has been performed, the routine 1100 continues to operation 1104.

At operation 1104, a second pass is made over the provision tables to establish the contents of the down pointer field 68 for each provision. First, the down pointers are established joining together all system table entries that belong to the same logical provision number. After this has been completed, the temporary array that holds the logical provision numbers can be discarded. Once the second pass over the provision tables has been completed, the routine 1100 continues to operation 1106.

At operation 1106, adjustments are made for any snapshot deletions. If any provisions are found that have sequence numbers that are not found in the sequence tables, they are merged with the next highest sequence number that is actually present, taking care to merge the new writes bitmap by removing all of the bits in the older provisions that have been set also in the newer bitmaps. If several provision tables need to be merged into the same sequence number, merging is done in descending order of sequence numbers. If a merge results in a new writes bitmap for a provision becoming fully zeroes, that provision is deleted. From operation 1106, the routine 1100 continues to operation 1108.

At operation 1108, each chain of down pointers is sorted, starting from the in-place location. From the in-place location, the first set of down pointers point to the provisions that have the same logical provision number, and which have the highest sequence number (i.e. the sequence numbers corresponding to the original volume). Subsequent down pointers are sorted in descending order of sequence numbers because this is the order that it would have been created in the case of a clean shutdown of the computer 2. From the operation 1108, the routine 1100 continues to operation 1110, where it ends.

Alternately, the entire process described in FIG. 11 may be also achieved through a logging architecture. If metadata is written persistently to the disk in the form of a log which keeps track of every I/O operation that changes a metadata structure such as the system table or the volume tables, then these tables can be reconstructed from on-disk versions by simply playing back the log and applying the logged changes to the structures in an incremental fashion.

It will be appreciated that embodiments of the present invention provide a method, apparatus, system, and computer-readable medium for allocating storage space in a data storage system on an as-needed basis. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-readable storage medium having stored thereon a data structure, the data structure comprising:
   a plurality of first data fields, each of the first data fields corresponding to a portion of an available physical storage capacity, wherein each of the first data fields comprises a field for identifying a provision, a field for providing a pointer to another of the first data fields, a field for identifying a sequence number, and a field for storing data indicating the areas of the corresponding portion of the physical storage capacity that have been written to; and
   a plurality of second data fields, each of the second fields corresponding to a logical portion of a data storage volume, and wherein each of the second data fields is operative to store a pointer to one of the first data fields for an allocated logical portion of the data storage volume.

2. The computer-readable storage medium of claim 1, wherein the first data fields together comprise a system table and wherein the second data fields together comprise a volume table.

3. The computer-readable storage medium of claim 2, further comprising a third plurality of data fields, the third data fields storing metadata from which the contents of the first data fields and the second data fields can be reconstructed.

4. A computer-implemented method for provisioning storage space in a computer system, the method comprising computer-implemented operations for:
   maintaining a first data structure comprising one or more entries, each entry in the first data structure corresponding to a portion of an available physical storage capacity, wherein the first data structure comprises a system table and wherein each entry in the system table corresponds to a provision on the mass storage device;
   providing, within each entry in the system table, a first field for storing data indicating the areas of the corresponding provision that have been written to, and a second field for providing a pointer to another entry in the system table;
   maintaining a second data structure comprising one or more entries, each entry in the second data structure corresponding to a logical portion of a data storage volume, wherein the second data structure comprises a volume table and wherein each entry in the volume table corresponds to a territory within the data storage volume, and wherein each entry in the second data structure is operative to store a pointer to an entry in the first data structure for each allocated logical portion of the data storage volume; and
   storing metadata each time a change is made to the system table, wherein the metadata comprises data from which the system table and volume table can be reconstructed.

5. The method of claim 4, further comprising:
   receiving a request to perform a data write operation within a territory on the data storage volume;
   in response to the request, determining whether physical space has been allocated for the territory to be written;
   in response to determining that physical space has not been allocated for the territory to be written, allocating physical space for the territory to be written; and
   performing the requested data write operation in the allocated physical space.

6. The method of claim 5, wherein determining whether physical space has been allocated for the territory to be written comprises determining whether the entry in the volume table corresponding to the territory to be written contains a pointer to an entry in the system table.

7. The method of claim 6, wherein allocating physical space for the territory to be written comprises creating a pointer in the entry in the volume table corresponding to the territory to be written to an unused entry in the system table.

8. The method of claim 7, further comprising maintaining a separate volume table for each data storage volume within the computer system.

9. The method of claim 8, wherein the size of each data storage volume within the computer system need not be specified in advance.

10. The method of claim 9, wherein multiple computer systems contribute to the available physical storage capacity.

11. A computer-readable storage medium having stored thereon a data structure, the data structure comprising:
    a plurality of first data fields, each of the first data fields corresponding to a portion of an available physical storage capacity, and comprises a field for identifying a provision, a field for providing a pointer to another of the first data fields, a field for identifying a sequence number, and a field for storing data indicating the areas of the corresponding portion of the physical storage capacity that have been written to;
    a plurality of second data fields, each of the second fields corresponding to a logical portion of a data storage volume, and wherein each of the second data fields is operative to store a pointer to one of the first data fields for an allocated logical portion of the data storage volume; and
    a third plurality of data fields, the third data fields storing metadata from which the contents of the first data fields and the second data fields can be reconstructed.

12. A computer-readable storage medium having computer-executable instructions stored thereon which, when executed by a computer, cause the computer to:
    maintain a first data structure comprising one or more entries, each entry in the first data structure corresponding to a portion of an available physical storage capacity, wherein the first data structure comprises a system table and wherein each entry in the system table corresponds to a provision on the mass storage device;
    provide, within each entry in the system table, a first field for storing data indicating the areas of the corresponding provision that have been written to, and a second field for providing a pointer to another entry in the system table;
    maintain a second data structure comprising one or more entries, each entry in the second data structure corresponding to a logical portion of a data storage volume, wherein the second data structure comprises a volume table and wherein each entry in the volume table corresponds to a territory within the data storage volume, and wherein each entry in the second data structure is operative to store a pointer to an entry in the first data structure for each allocated logical portion of the data storage volume; and to store metadata each time a change is made to the system table, wherein the metadata comprises data from which the system table and volume table can be reconstructed.

13. The computer-readable storage medium of claim 12, having further computer-executable instructions stored thereon which, when executed by the computer, cause the computer to:

receive a request to perform a data write operation within a territory on the data storage volume;

in response to the request, to determine whether physical space has been allocated for the territory to be written;

in response to determining that physical space has not been allocated for the territory to be written, to allocate physical space for the territory to be written; and to perform the requested data write operation in the allocated physical space.

14. The computer-readable storage medium of claim 13, wherein determining whether physical space has been allocated for the territory to be written comprises determining whether the entry in the volume table corresponding to the territory to be written contains a pointer to an entry in the system table.

15. The computer-readable storage medium of claim 14, wherein allocating physical space for the territory to be written comprises creating a pointer in the entry in the volume table corresponding to the territory to be written to an unused entry in the system table.

16. The computer-readable storage medium of claim 15, having further computer-executable instructions stored thereon which, when executed by the computer, cause the computer to maintain a separate volume table for each data storage volume within the computer system.

17. The computer-readable storage medium of claim 16, wherein the size of each data storage volume within the computer system need not be specified in advance.

18. The computer-readable storage medium of claim 17, wherein multiple computer systems contribute to the available physical storage capacity.

* * * * *